Figure 1:
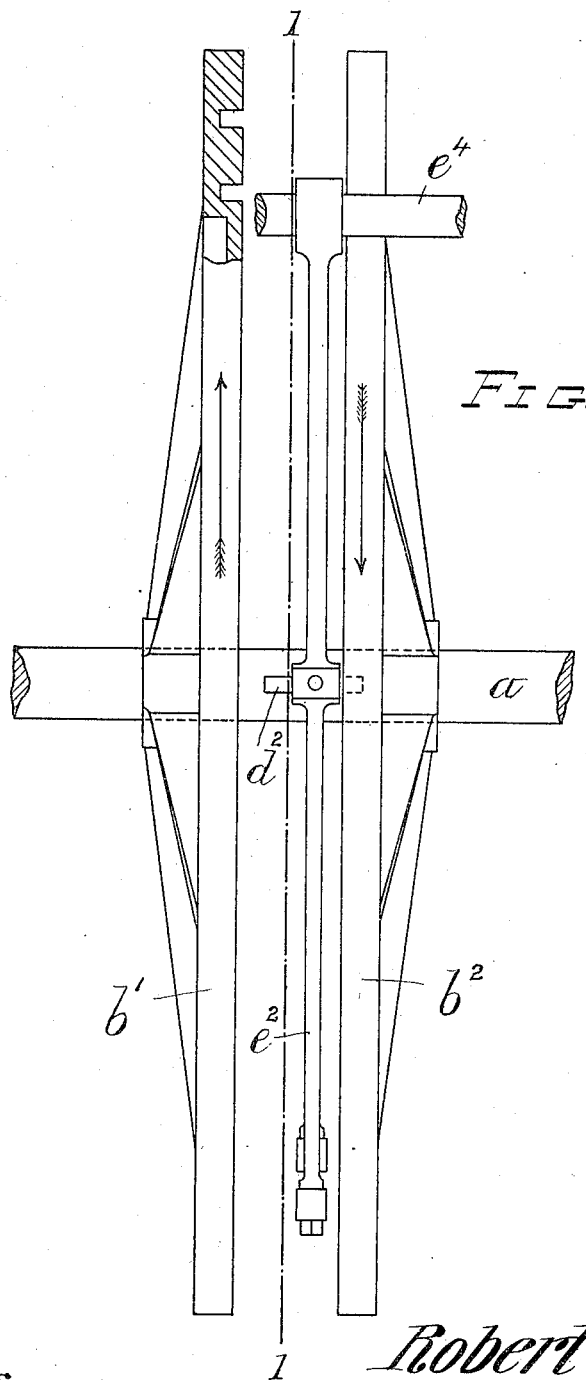

R. J. WORTH.
WINDING ENGINE FOR COLLIERIES OR LIKE PURPOSES.
APPLICATION FILED AUG. 26, 1909.

1,029,410.

Patented June 11, 1912.

10 SHEETS—SHEET 1.

Robert J. Worth
INVENTOR.

ATTORNEYS.

R. J. WORTH.
WINDING ENGINE FOR COLLIERIES OR LIKE PURPOSES.
APPLICATION FILED AUG. 26, 1909.

1,029,410.

Patented June 11, 1912.

10 SHEETS—SHEET 3.

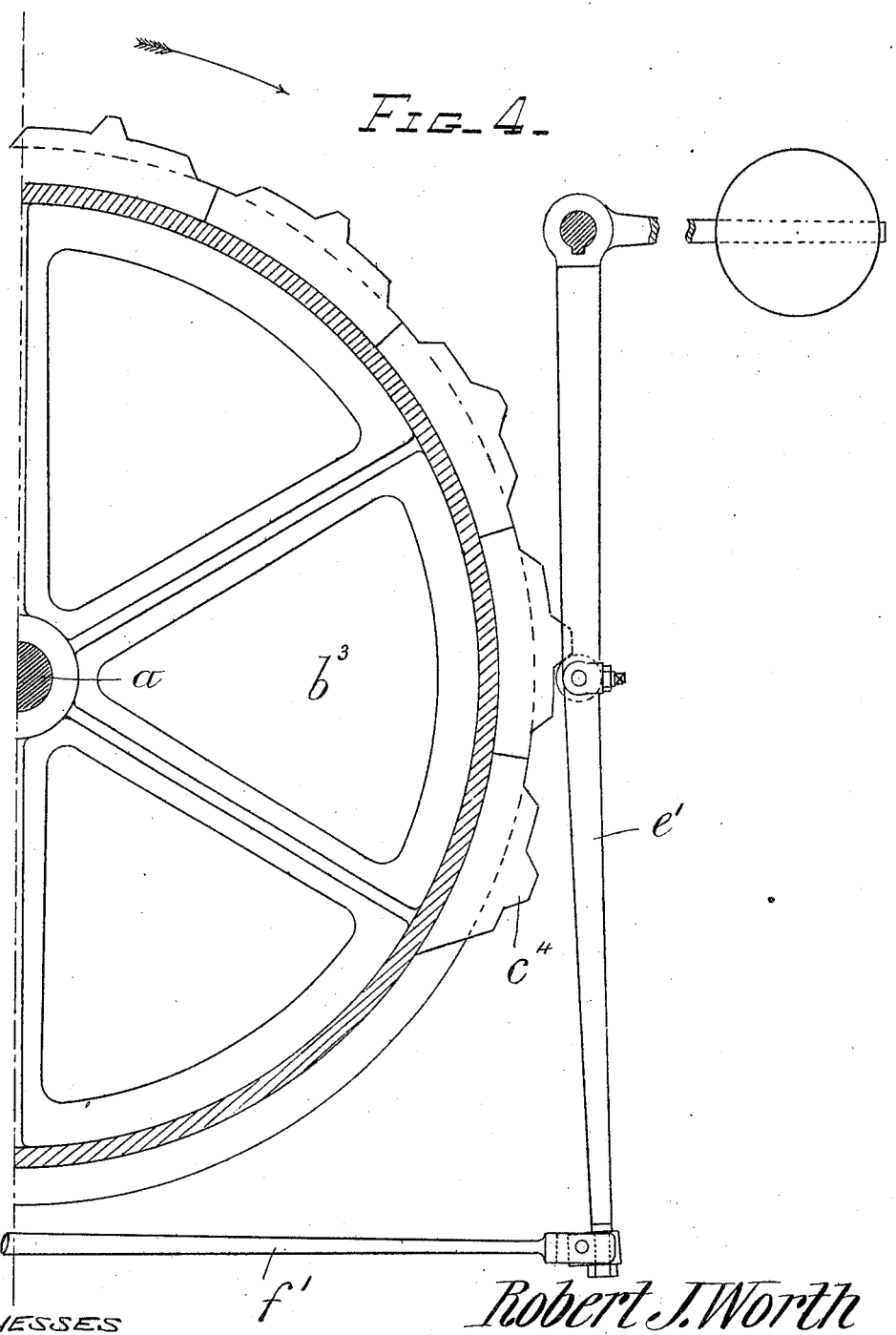

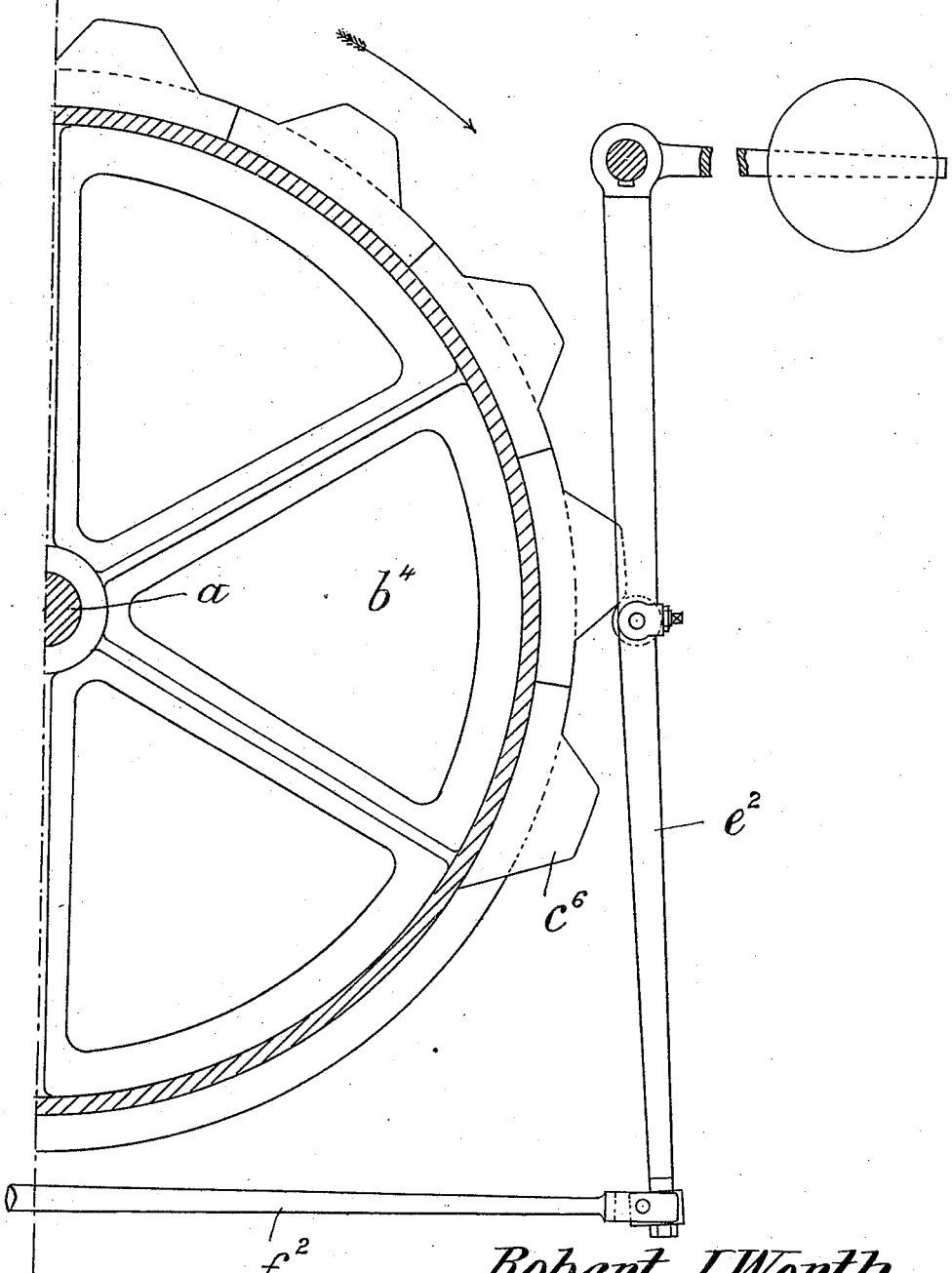

R. J. WORTH.
WINDING ENGINE FOR COLLIERIES OR LIKE PURPOSES.
APPLICATION FILED AUG. 26, 1909.
1,029,410.
Patented June 11, 1912.
10 SHEETS—SHEET 6.
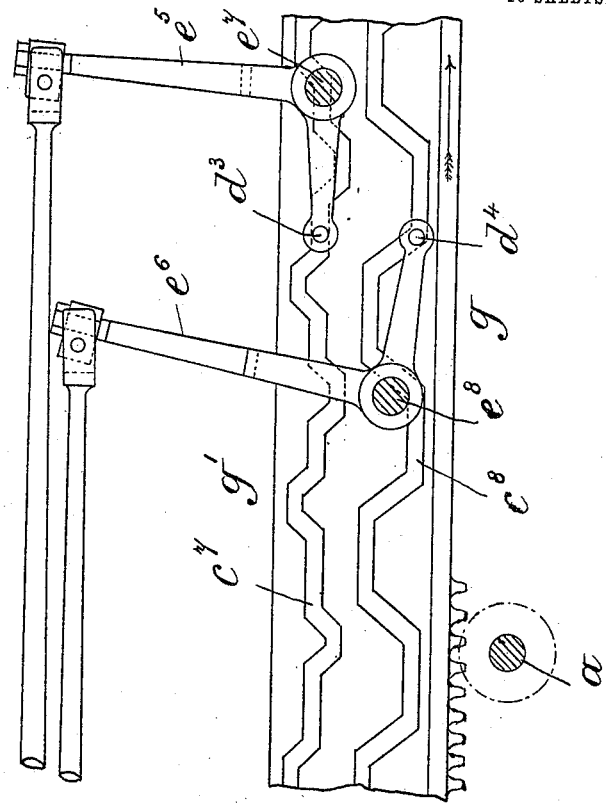
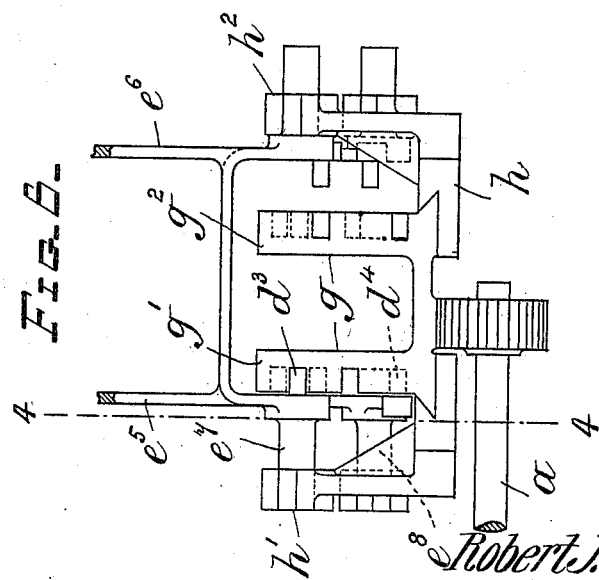

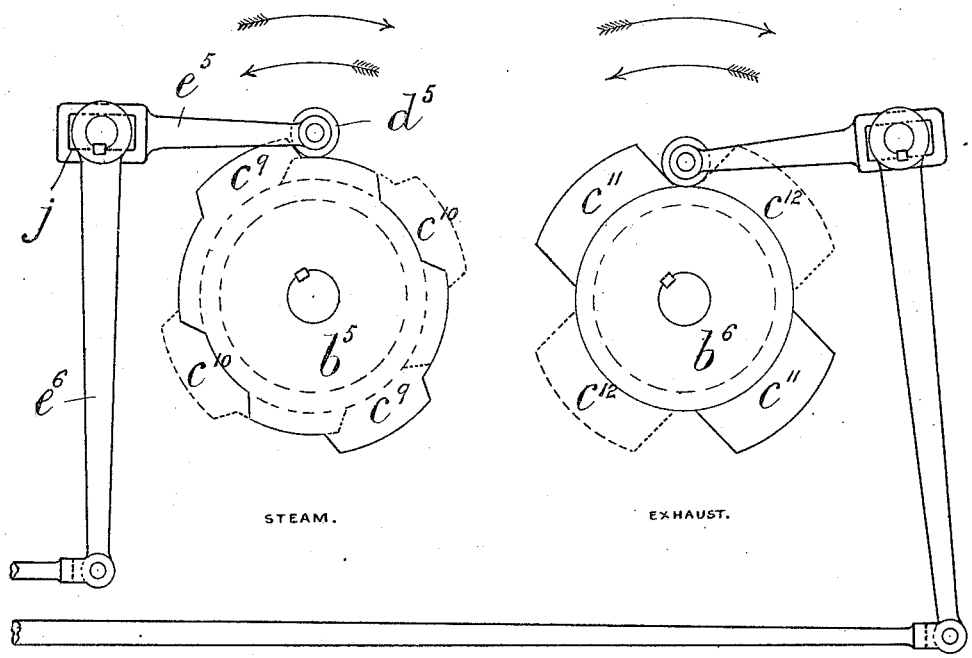
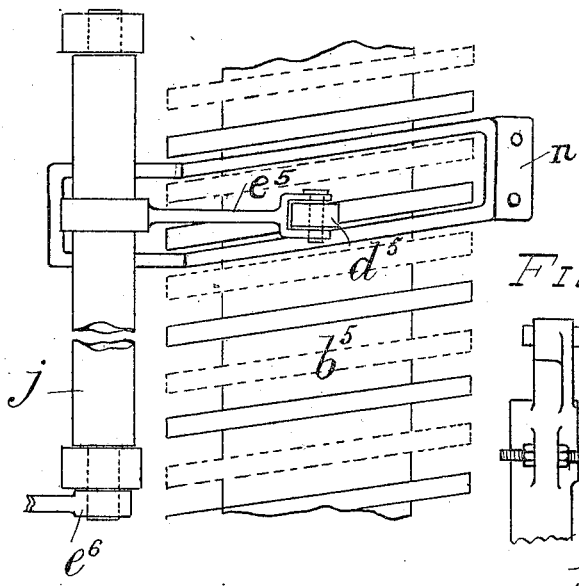
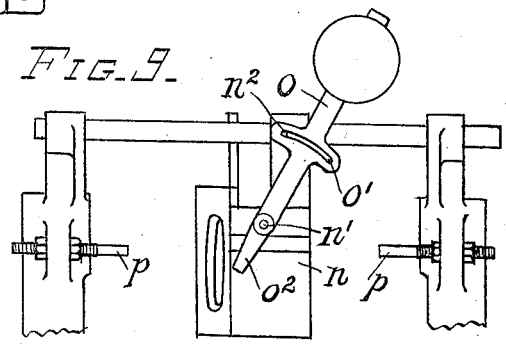

R. J. WORTH.
WINDING ENGINE FOR COLLIERIES OR LIKE PURPOSES.
APPLICATION FILED AUG. 26, 1909.
1,029,410.
Patented June 11, 1912.
10 SHEETS—SHEET 8.
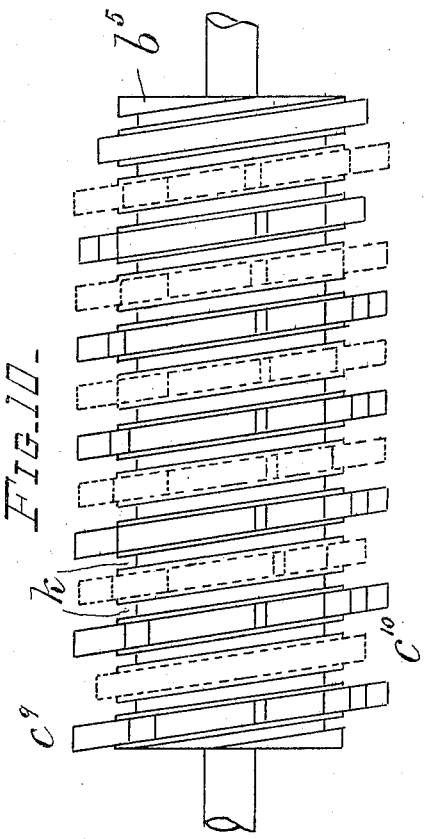
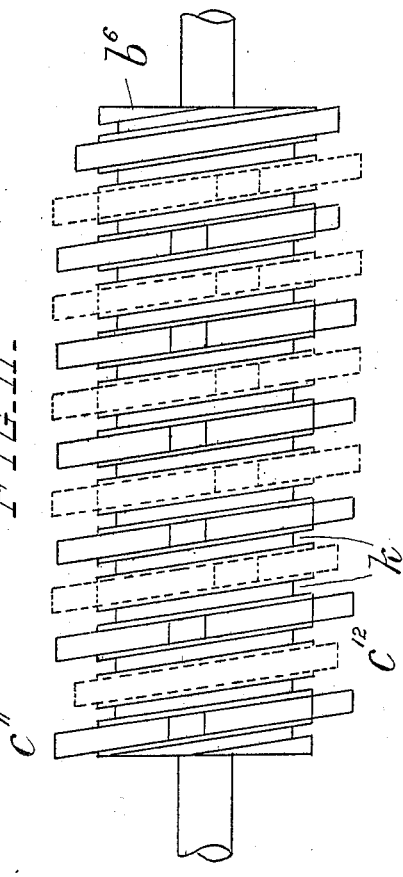
Robert J. Worth
INVENTOR.
WITNESSES
ATTORNEYS.

R. J. WORTH.
WINDING ENGINE FOR COLLIERIES OR LIKE PURPOSES.
APPLICATION FILED AUG. 26, 1909.
1,029,410.
Patented June 11, 1912.
10 SHEETS—SHEET 9.
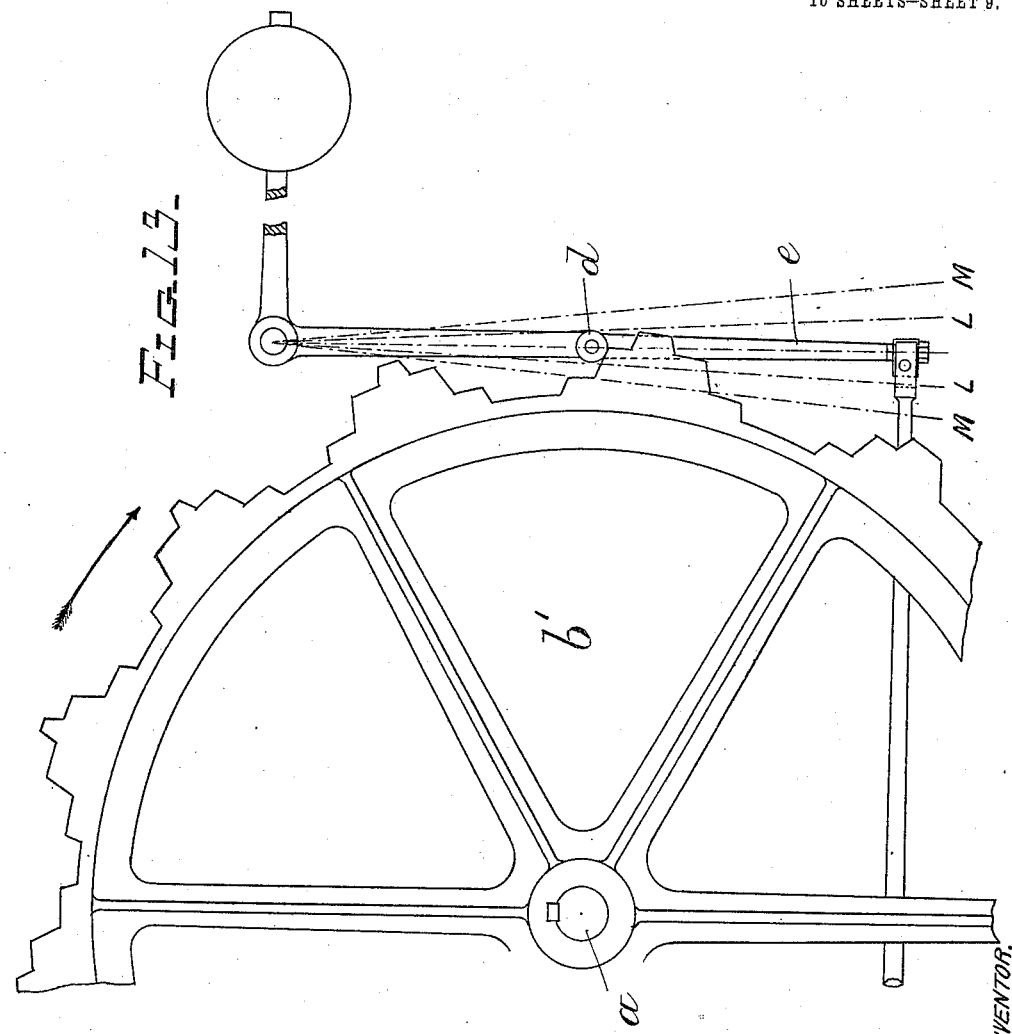
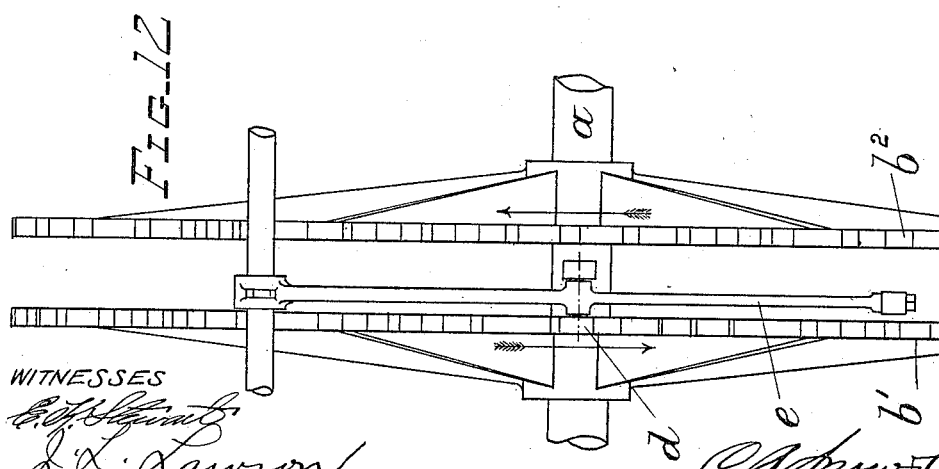

R. J. WORTH.
WINDING ENGINE FOR COLLIERIES OR LIKE PURPOSES.
APPLICATION FILED AUG. 26, 1909.
1,029,410.
Patented June 11, 1912.
10 SHEETS—SHEET 10.
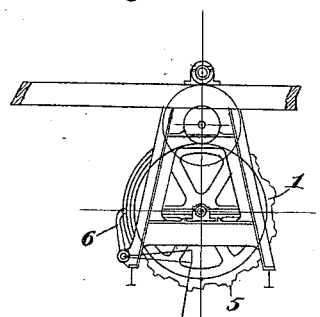
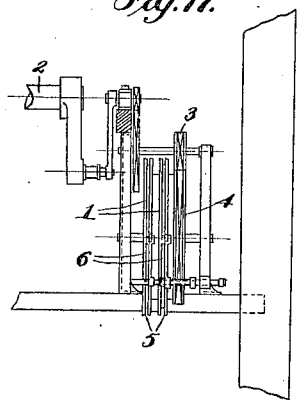
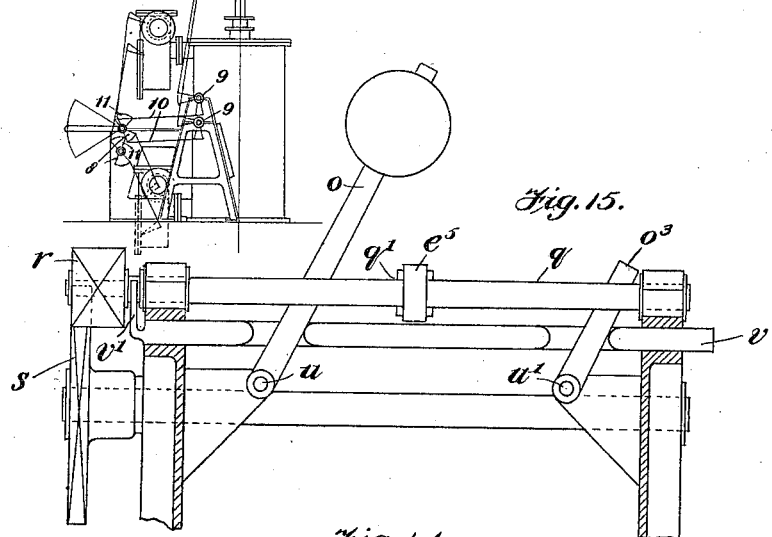
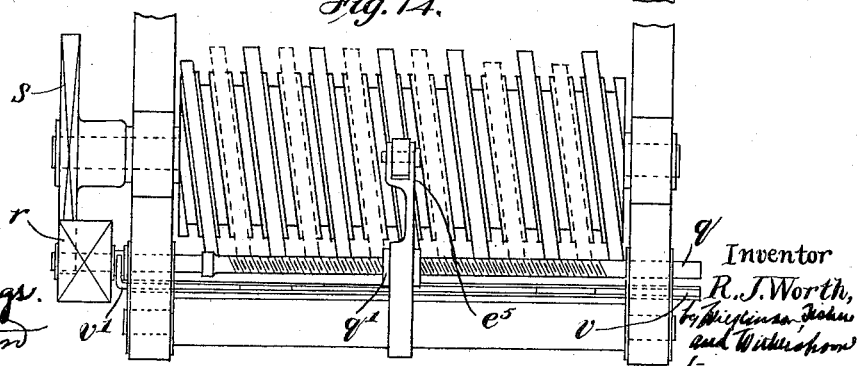

UNITED STATES PATENT OFFICE.

ROBERT JAMES WORTH, OF STOCKTON-ON-TEES, ENGLAND.

WINDING-ENGINE FOR COLLIERIES OR LIKE PURPOSES.

1,029,410.    Specification of Letters Patent.    Patented June 11, 1912.

Application filed August 26, 1909. Serial No. 514,781.

*To all whom it may concern:*

Be it known that I, ROBERT JAMES WORTH, a subject of the King of Great Britain and Ireland, residing at Stockton-on-Tees, in the county of Durham, England, have invented certain new and useful Improvements in Connection with Winding-Engines for Collieries or the Like Purposes; and I do hereby declare the following to be a full, clear, and exact description of the invention, such as will enable others skilled in the art to which it appertains to make and use the same.

In engines of the kind to which this invention applies such as colliery winding engines, the valve gear is at present worked either from some reciprocating part of the engine, or from the crank shaft or other shafts or rods, the movements of which synchronize with the reciprocating parts of the engine, with the result that the steam is usually worked non-expansively and the lack of lead on the exhaust valves often causes considerable back pressure in the cylinder especially in the case of the vertical type of engine frequently in use in the coal pits of Durham. A further result of this design of engine is that it depends entirely upon the man in charge of the engine, or some specially provided machinery, whether the engine is stopped at the proper time to prevent overwinding.

By the improvements constituting this invention, the valve gear is so worked that any desired amount of expansion of the steam is available within the practical limits, and the correct lead can be given to the exhaust valves, thereby effecting economy of steam, and overwinding is automatically prevented, instead of depending upon the skill and attention of the engineman or the reliability of specially provided machinery. These results are attained by means of a series of cams arranged to form cam paths, which are traversed once per wind past pins or rollers or their equivalents connected to levers or rods, or a combination of these, actuating the steam distribution valves, the cam paths being so arranged and designed that the movement communicated to the valves by the said levers or rods is such that the steam is cut off from the cylinder at each stroke of the piston as accords with the load on the engine at that particular stroke, the exhaust being also regulated to correspond, that is to say, the cut off of steam is varied to suit the load, and the lead is varied to suit the speed and furthermore the cams on the cam paths are brought to an end at a predetermined point in advance of the completion of the wind, so that the engine valves being no longer opened thereby, the engine is automatically slowed down or brought to a standstill for want of steam before the cage reaches the bank.

The machinery adapted for the purposes of my invention is capable of various modifications, and will be clearly understood as the description of the construction and operation of the apparatus proceeds, for which purpose I shall refer to the drawings forming part of this specification, in which the same letters of reference indicate the same or corresponding parts in all the figures.

Figure 2:
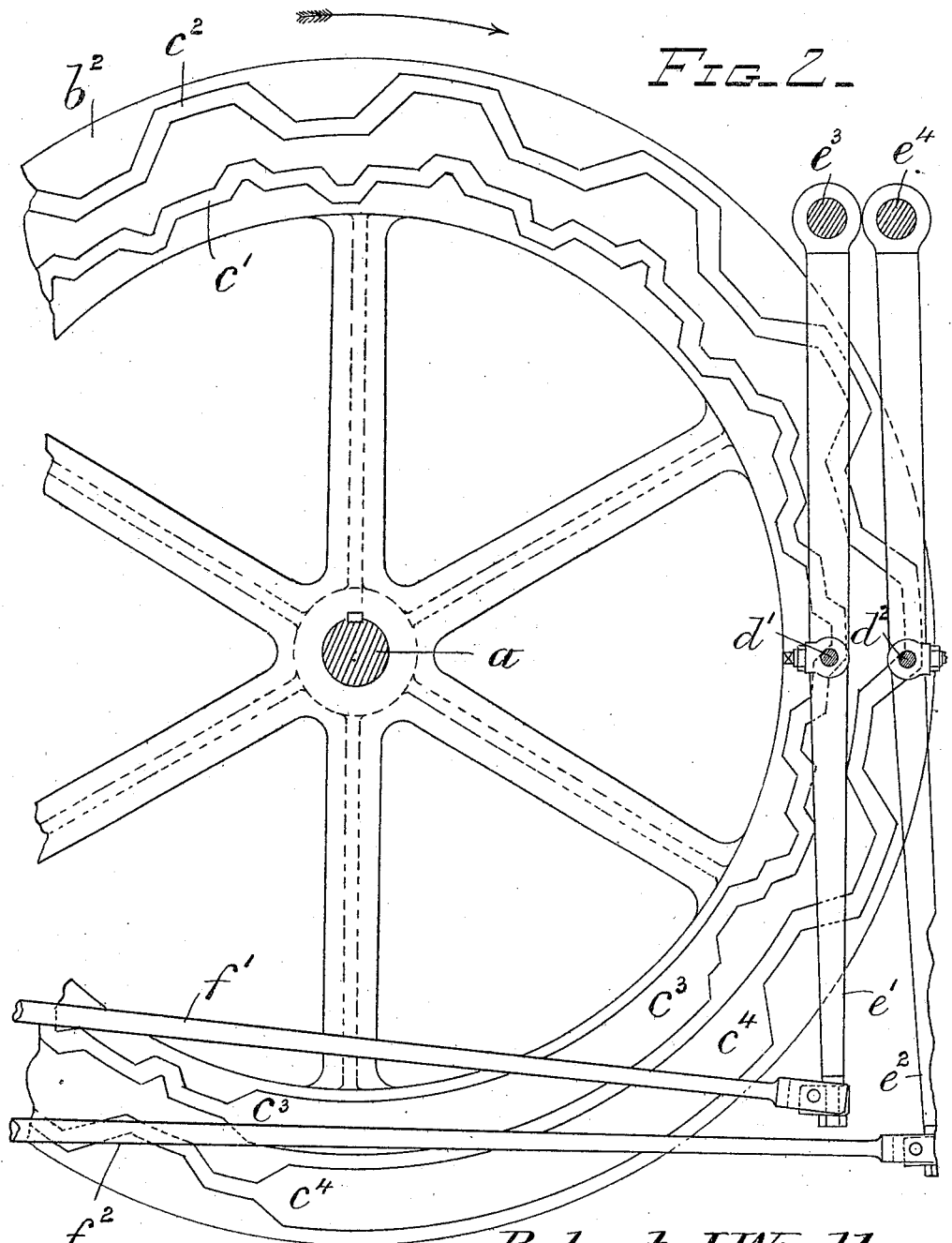
Figure 3:
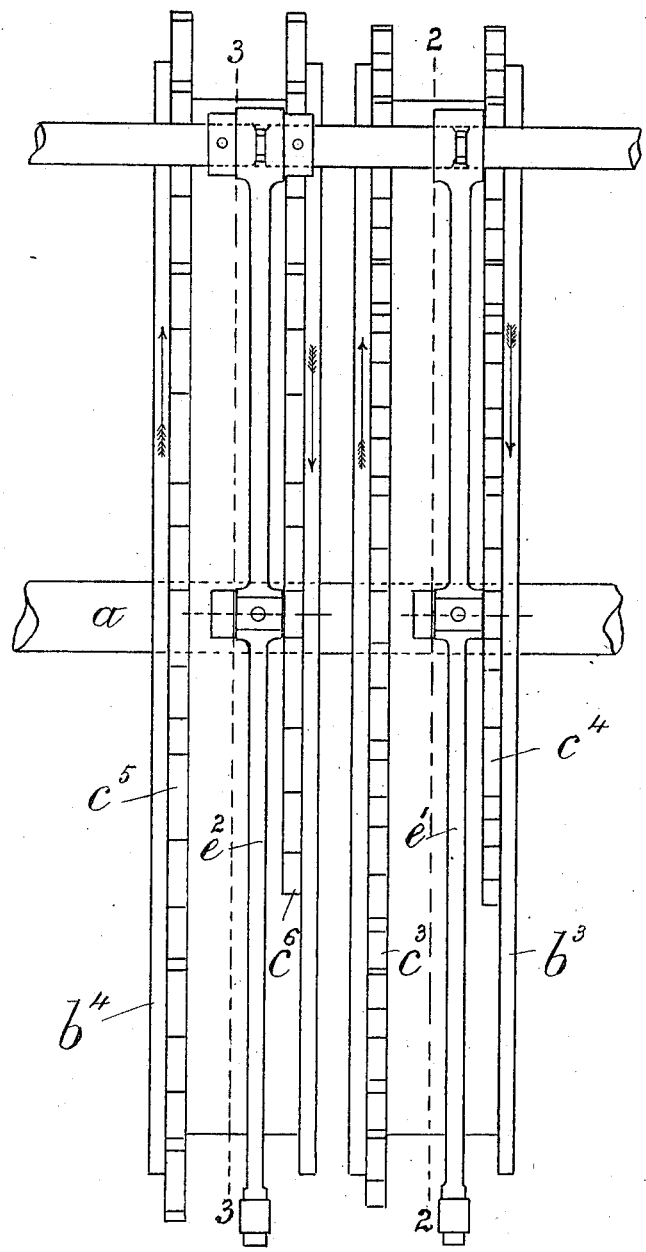

Figure 1 is an end view of one form of the mechanism. Fig. 2 is a section on the line 1—1 of Fig. 1, looking to the right of said line. Fig. 3 is an end view of the modification. Fig. 4 is a section of a portion of the mechanism shown in Fig. 3, the section being on the line 2—2. Fig. 5 is a similar section taken on the line 3—3 of Fig. 3. Fig. 6 is an end view of another modification. Fig. 7 is a section on the line 4—4 of Fig. 6. Figs. 8 to 11 illustrate another modification. Fig. 12 is an end view of still another modification; and Fig. 13 is a partial elevation of the mechanism shown in Fig. 12. Figs. 14 and 15 illustrate a modification of the means shown in Figs. 8 to 11; Figs. 16 and 17 illustrate diagrammatically my improved gear applied to a single cylinder vertical engine, Fig. 16 being an elevation taken endwise of the intergeared shafts; and Fig. 17 a corresponding side elevation so far as the connection between the engine and crank shafts is concerned.

Referring to Figs. 1 and 2 in which the cam paths run around the face of a disk, Fig. 1 shows two such disks placed opposite each other, one of which drives the valves of the engine for one direction of rotation, and the opposite one drives the valves for the other direction of rotation, for the sake of simplicity of description hereinafter referred to as for reversing purposes.

In Figs. 1 and 2, *a* is the cam path shaft which is so geared to the engine main shaft as to make not exceeding one revolution in winding the cage the full depth of the pit.

This shaft carries the two disks $b'$ $b^2$, each provided with a steam admission cam path $c'$ and a steam exhaust cam path $c^2$, which as the disk rotates are traversed by the pins $d'$ $d^2$ or their equivalents secured to the levers $e'$ $e^2$ pivoted at $e^3$ $e^4$ and connected at their free ends to valve rods $f'$ $f^2$. It will now be seen that by rotating the shaft $a$ in the direction indicated by the arrows, the pins $d'$ $d^2$ will have a special movement imparted to them, which movement is transmitted through the valve gear to the valves of the engine cylinder, and by suitably designing the contour of each cam path $c'$ $c^2$ the particular movement desired will be imparted to the valves concerned. In practice the load on the engine is greatest at the commencement of the wind and steadily diminishes toward the end of same, consequently I so shape the cams as to retain the steam valves open until nearly the end of the stroke at the beginning of each wind and to close them earlier and earlier in each stroke as the load on the engine decreases, and this I term the graduation of the cams to suit the load. It will be observed that the cams on the cam paths do not follow the full circle of the disk, a blank being left at $c^3$ $c^3$ and $c^4$ $c^4$ so that when the pins or their equivalents $d'$ $d^2$ are traversing these blanks, they, of course do not impart any motion to the valve gear. Consequently the engine is slowed up or brought to a standstill for want of steam. This takes place when the cage is approaching the top of the wind, which can then be completed by the valves being worked by the engineman, which of course insures a provision against overwidening which is absolutely reliable. In order to reverse the engine, the valve gear is disengaged from the disk $b^2$ and geared into disk $b'$, where the cam paths are set the opposite way. This can be done in any convenient way, whether automatically or by the engineman working a hand lever.

Figs. 3, 4 and 5 illustrate how my invention can be modified by mounting the cam paths on the periphery of a drum, double drum or series of wheels. In Fig. 3 a double drum is shown with two cam paths mounted on each, the steam admission cam paths being projected from the periphery of the drum $b^3$ and the steam exhaust cam paths from the periphery of drum $b^4$. Fig. 4 is a side view of the upper half of drum $b^3$ looking to the right on line 2—2, and Fig. 5 is a similar view of drum $b^4$ looking to the right on line 3—3. Both cam paths on drum $b^3$ are for steam admission which the cam paths on drum $b^4$ are for the corresponding steam exhausts. Cam path $c^3$ on drum $b^3$, corresponding to cam path $c^5$ on drum $b^4$ and cam path $c^4$ on drum $b^3$ similarly corresponding to cam path $c^6$ on drum $b^4$, so that by transferring the levers and roller pins from one side to the other of each drum, the engine is reversed in the manner already described with reference to Figs. 1 and 2, and furthermore the same graduation in the steam admission cam paths is provided to suit the supply of steam to the load all through the wind, with the same blank in all the cam paths to stop the supply of steam altogether as the cage or load is reaching the bank.

Figs. 6 and 7 illustrate how the requisite cam paths may be fixed to a bar or slide which is driven by positive gear by the engine at one stroke per wind, Fig. 6 being an end view and Fig. 7 an outside view of a double cam path looking to the right from line 4—4, the parts external to which being omitted to avoid confusion of lines. In this case the cam path shaft $a$ is geared by pinion and rack or other positive gear, to the bar $g$ forming a hollow or channel beam. On each of the outer sides $g'$ $g^2$ is provided a steam admission cam path $c^7$ and steam exhaust cam path $c^8$, the steam admission cam path $c^7$ being graduated after the same manner and for the same reason as already explained with reference to the graduation of cam paths $c'$ in respect of Figs. 1 and 2. The levers $e^5$ and $e^6$ are shown in the form of bell crank levers pivoted at $e^7$ $e^8$ in the sides $h'$ $h^2$ of the frame $h$ which serves as a bed plate to channel beam $g$, the cam paths on side $g$ of this channel beam $g$ being set in the opposite direction to those on side $g^2$, the engine can be reversed by sliding the said levers across from being in gear with cam paths on $g'$ to those on $g^2$ or vice versa. The cam paths terminate as before at either end in time to stop the supply of steam as the case or load is reaching the top of the wind to render overwinding impossible.

Figs. 8, 9, 9$^a$, 10, and 11, and Figs. 14 and 15 are intended to illustrate in what way the cam path can be arranged spirally around a drum, that is the steam admission cam paths around one drum and the steam exhaust cam paths around another drum, as would be usual when the engine is provided with separate steam and exhaust valves. Suitable mechanism to insure that the longitudinal travel of the valve rod lever is made to synchronize correctly with the advance of the cam path and that the cam path is changed for reversing purposes as required is also illustrated in this group of figures in which Fig. 8 shows the drums in end elevation bringing into view the valve rod mechanism in connection therewith. Fig. 9 is a plan view of one drum showing how the valve rod mechanism is supported and guided in connection therewith, Fig. 9$^a$ being a side elevation of Fig. 9 looking to the right and showing how the longitudinal travel of the valve rod lever is regulated and reversed as required, Figs. 10 and 11 being plan views of the steam supply and exhaust drums respectively showing the cam paths divested of all other mechanism, two separate cam paths being provided on each drum for reversing purposes, that is to say, the steam admission cam paths $c^9$ $c^{10}$ on drum $b^5$ are graduated in the manner already described, but in opposite directions, whereas the steam exhaust cam paths $c^{11}$ $c^{12}$ on drum $b^6$ which are uniform are set to correspond respectively with cam paths $c^9$ $c^{10}$. The arms $e^5$ $e^6$ constitute a lever having provision for one arm $e^5$ moving along its fulcrum in order to traverse the length of the drum, whereas the other arm $e^6$ shares no such movement but simply rocks or oscillates with the same fulcrum bar to an extent corresponding to the like movements of the arm $e^5$ as derived from the action of the cams. The fulcrum bar $j$ may be supported in any convenient way so that the lever arms $e^5$ can slide along it in a direction parallel to the axis of the drum, the pin or friction roller $d^5$ or its equivalent is kept in contact with the proper cam path by a weight or its equivalent, the requisite longitudinal motion being imparted to it so as to follow the line of its cam path as the drum revolves, thus if each cam path were placed on the drum at 6 inches actual pitch, the two cam paths would appear as a double threaded screw pitched at 3 inches center to center and the lever arm $e^5$ would be traversed along the bar $j$ 6 inches per revolution of the drum.

In order to insure that the longitudinal travel of the lever arm $e^5$ synchronize correctly with the advance of the cam path to which it is applied, suitable means are provided such as a screw $k$ with either single or double thread made in the body of the drum having the same pitch as the spirals of the cam path as shown in Figs. 10 and 11, or the cams themselves may be used as the screw for giving the motion, as shown in Fig. 9, plates or other sliding pieces $n$ would be fitted into the screw or between the rows of cams to form guides for traversing the levers along the drum. Suitable mechanism for automatically changing the lever rod $e^5$ from one row of cams to the other for reversing purposes is shown in Fig. 9$^a$, consisting of a weighted lever $o$ pivoted to the sliding box or plate $n$ at $n'$, a tumble over movement sufficient to change from one over balanced position to the other being provided for by the slot $o'$ working on the pin $n^2$. When the tail $o^2$ of this lever encounters the stop bar $p$, the lever is lifted over to the opposite position and the lever arm $e^5$ changed to the other cam row, this taking place as the end of each cam track is reached. Or a separate screw shaft suitably pitched in threads and geared at the proper ratio to run in connection with the lever arm and at the right speed could be used for the same purpose, such screw shaft being preferably geared to the drum shaft, provision being made for a weighted lever with a tumbler movement as before automatically changing the lever arm $e^5$ from one cam row to the other for reversing purposes. Referring to Figs. 14 and 15 illustrating this mechanism, Fig. 14 is a plan view of a spiral cam drum furnished with a separate screw shaft $q$ geared to the said cam drum by the pinion $r$ and spur wheel $s$, the lever arm $e^5$ being mounted thereon by a screw thread bearing or nut $q'$. $o$ is the weighted tumble lever pivoted at $u$ to a bracket extending from the end frame of the cam drum, a similar tumbler lever $o^3$ is provided and pivoted at $u'$ to a bracket on the other end frame but only one of these levers need carry a weight. $v$ is a bar so connected to the shaft $q$ at $v'$ that the sliding movement of the bar $v$ is shared by the shaft $q$, consequently when the arm $e^5$ encounters either tumbler lever $o$ or $o^3$ the said arm is changed as before from one cam row to the other.

The engine is reversed by changing the pin or roller from one cam to the other, by moving the lever longitudinally in relation to the drum, or where a separate driving screw is employed the drum may be moved relatively to the lever arm, and this latter method of reversing equally applies to the several modifications hereinbefore described except that in the case of the modification described in Figs. 6 and 7 it would usually be not so desirable.

Instead of having separate drums for driving the steam and exhaust as shown in the drawings, all the four cam paths can be wrapped around the same drum, thus forming a quadruple system of spirals, instead of a double system. In all cases the spiral terminates before the wind is completed to shut off steam as before described.

Figs. 12 and 13 following the type of apparatus already described with reference to Figs. 3, 4 and 5, that is, with the cam paths on the periphery are intended to show how one cam path is arranged to work both steam and exhaust valves, Fig. 12 showing two disks mounted on one shaft for reversing purposes, and Fig. 13 being a half view looking to the right. In this arrangement when the lever $e$ carrying the pin or roller $d$, which bears on the cams is at the center of its motion as shown in Fig. 13, all the valves are shut. As the cam path moves around, the lever is moved in or out from the mid position, the first portion of its motion in either direction opening the exhaust for one or other end of the cylinder as shown in dotted lines marked L L on the same figure, this motion opens the exhaust so as to give a sufficient amount of pre-exhaust to suit the speed at which the engine is intended to run, which is usually wide open or nearly so, further motion of the lever to the outside dotted lines M M causes the opening of the steam valve for the opposite end of the cylinder. Further motion of the cam path brings the lever back to one of the positions marked L L thus cutting off the supply of steam while still leaving the corresponding exhaust valve open until nearly the end of the stroke, the motion of the lever then recommences, first closing that exhaust, then opening the opposite one and the cycle of operations then continues so long as there are cams to work the lever. The point of the stroke at which steam is cut off may be varied to any extent by varying the shape of the cams. This type of cam path is suited for engines with any type of valve whatever, but when there are separate steam and exhaust valves such an amount of lost motion must be provided at the steam valves, or in the gear driving them as will allow the exhaust valves to open to the required extent before the steam valves commence to open. When a single valve such as a slide valve is used both for steam and exhaust, a sufficient amount of lap must be provided on the steam side as will allow of the exhaust port opening to the required extent before the steam port at the opposite end of the cylinder begins to open. This type of cam path controlling both steam and exhaust valves by one lever may be fitted to the face of disks as shown in Figs. 1 and 2 on the sliding bar as shown in Figs. 6 and 7, or wrapped spirally around a drum as shown in Figs. 8, 9, 10 and 11, as well as on the periphery of a drum as shown in Figs. 12 and 13.

Whichever type of cam paths I adopt and whichever method of driving them I adopt, I omit the cams relating to one or more revolutions of the engine as the cage is approaching the bank for the purpose of reducing the speed or stopping the engine altogether. Where wrapped spirally around a drum as only two cam paths are required only one drum is required, and the cam paths are arranged as a double thread on the drum.

Referring to Figs. 16 and 17, 1 is the drum which carries the cams for working the valves and may be placed in any convenient position in the engine house so that it can be driven from the main shaft 2 of the engine by positive gear at a speed not exceeding one revolution per wind, that is to say that if the shaft 2 makes 10 revolutions per wind, the spur wheels 3 and 4 would be geared in the ratio of 10 to 1 so that the cam shaft made one revolution while the engine shaft made 10 revolutions. 5 5 are the cam paths on the drum 1. 6 6 are the levers with contact rollers working on the cams and connected to the rods 7 7, the other ends of which rods are connected to the weight bars 8 8 of the distribution valves, the connection being in this case through bell crank levers 9 9 and gab rods 10 10 working on levers 11 11, which can be instantly disconnected in case it is required to stop the engine during the wind. This arrangement must be taken as adapted to the particular circumstances for which it was designed, in which the engine valves were placed several feet below the cam shaft and engine main shaft, but in some cases the valve gear and cam gear may be on the same level or otherwise set apart or near together according to the size and position of the engine house and other conditions of environment. In these drawings and descriptions I have referred to the gear as applied to driving the valves of a single cylinder, but where there are two cylinders there may be separate cam paths for each cylinder, or the same cam paths may be used for both cylinders by arranging a second set of levers carrying pins, rollers or sliding pieces, which pins, rollers, or sliding pieces engage with the cams, the exact distance from the first set which the cam will move while the engine moves the distance equal to the angle between the cranks.

I would further observe that although I have shown straight levers in some figures, and bell crank levers in others, it should be understood that it will be entirely a question of convenience which form of lever is best adapted to the particular arrangements or conditions under which my invention is to be applied straight levers being more convenient in some cases and bell crank levers in others.

I claim:—

1. A valve gear for winding engines comprising a movable element operatively connected to the engine to move synchronous therewith, the engine having a steam valve and an exhaust valve, means for operating the valves, means on the aforesaid movable element for actuating the valve operating means, and means on the movable element for stopping the operation of the valve gear at a predetermined time.

2. A valve gear for winding engines comprising a movable element operatively connected to the engine to move synchronous therewith, the engine having a steam valve and an exhaust valve, means for operating the valves, means on the aforesaid movable element for actuating the valve operating means, said actuating means being arranged to progressively increase the lead of the exhaust valve and to advance the cut-off of the steam valve after the commencement of the wind, and means on the movable element for stopping the operation of the valve gear at a predetermined time.

3. A valve gear for winding engines comprising a movable element operatively connected to the engine to move synchronous therewith, the engine having a steam valve and an exhaust valve, means for operating the valves, and means on the aforesaid movable element for actuating the valve operating means, said actuating means being arranged to progressively increase the lead of the exhaust valve, and to advance the cut-off of the steam valve after the commencement of the wind.

4. A valve gear for winding engines comprising a movable element operatively connected to the engine to move synchronous therewith, the engine having a steam valve and an exhaust valve, means for operating the valves, and a series of successively operating means on the aforesaid movable element for actuating the valve operating means, said actuating means corresponding in number to the number of strokes required to be made by the engine for one complete wind.

5. A valve gear for winding engines comprising a movable element operatively connected to the engine to move synchronous therewith, the engine having a steam valve and an exhaust valve, means for operating the valves, and a series of successively operating means on the aforesaid movable member for actuating the valve operating means, said actuating means being arranged to progressively increase the lead of the exhaust valve, and to advance the cut-off of the steam valve after the commencement of the wind.

6. A valve gear for winding engines comprising a movable element operatively connected to the engine to move synchronous therewith, the engine having a steam valve and an exhaust valve, means for operating the valves, and a series of successively operating means on the aforesaid movable element for actuating the valve operating means, said actuating means being arranged to progressively increase the lead of the exhaust valve, and to advance the cut-off of the steam valve after the commencement of the wind, and said actuating means corresponding in number to the number of strokes required to be made by the engine for one complete wind.

7. A valve gear for winding engines comprising a movable element operatively connected to the engine to move synchronous therewith, the engine having a steam valve and an exhaust valve, means for operating the valves, and a series of successively operating cams on the aforesaid movable element for actuating the valve operating means, said cams corresponding in number to the number of strokes required to be made by the engine for one complete wind.

8. A valve gear for winding engines comprising a movable element operatively connected to the engine to move synchronous therewith, the engine having a steam valve and an exhaust valve, means for operating the valves, and a series of successively operating cams on the aforesaid movable element for actuating the valve operating means, the contour of said cams being varied to impart a motion to the valve gear by which the lead of the exhaust valve is progressively increased, and the cut-off of the steam valve advanced after the commencement of the wind.

9. A valve gear for winding engines comprising a movable element operatively connected to the engine to move synchronous therewith, the engine having a steam valve and an exhaust valve, means for operating the valves, and a series of successively operating cams on the aforesaid movable element for actuating the valve operating means, the contour of said cams being varied to impart a motion to the valve gear by which the lead of the exhaust valve is progressively increased and the cut-off of the steam valve advanced after the commencement of the wind, and said cams corresponding in number to the number of strokes required to be made by the engine for one complete wind.

10. A valve gear for winding engines comprising movable elements operatively connected to the engine to move synchronous therewith, the engine having a steam valve and an exhaust valve, means for operating the valves, and means on the aforesaid movable elements for actuating the valve operating means, one of said movable elements being arranged to actuate the valve for one direction of rotation, and the other element for the other direction of rotation of the engine.

11. A valve gear for winding engines comprising movable elements operatively connected to the engine to move synchronous therewith, the engine having a steam valve and an exhaust valve, means for operating the valves, and means on the aforesaid movable elements for actuating the valve operating means, one of said movable elements being arranged to actuate the valve for one direction of rotation, and the other member for the other direction of rotation of the engine, and the actuating means upon said elements being arranged to progressively increase the lead of the exhaust valve, and to advance the cut-off of the steam valve after the commencement of the wind.

12. A valve gear for winding engines comprising movable elements operatively connected to the engine to move synchronous therewith, the engine having a steam valve and an exhaust valve, means for operating the valves, means on the aforesaid movable elements for actuating the valve operating means, and means on the movable elements for stopping the operation of the valve gear at a predetermined time, one of said movable elements being arranged to actuate the valve for one direction of rotation, and the other member for the other direction of rotation of the engine.

13. A valve gear for winding engines comprising a movable element operatively connected to the engine to move synchronous therewith, the engine having a steam valve and an exhaust valve, means for operating the valves, and a series of successively operating cams on the aforesaid movable element for actuating the valve operating means, there being a break in the series to stop the operation of the valve.

14. A valve gear for winding engines comprising a movable element operatively connected to the engine to move synchronous therewith, the engine having a steam valve and an exhaust valve, means for operating the valves, and a series of successively operating cams on the aforesaid movable element for actuating the valve operating means, there being a break in the series to stop the operation of the valve, and the contour of the cams being varied to impart a motion to the valve gear by which the lead of the exhaust valve is progressively increased, and the cut-off of the steam valve advanced after the commencement of the wind.

In testimony whereof, I affix my signature, in presence of two witnesses.

ROBERT JAMES WORTH.

Witnesses:
 TOM NEWBOLD CUMMINS BARBER,
 RICHARD TINKLER.

Copies of this patent may be obtained for five cents each, by addressing the "Commissioner of Patents, Washington, D. C."